United States Patent
Kim

(10) Patent No.: US 8,055,240 B2
(45) Date of Patent: Nov. 8, 2011

(54) METHOD OF NOTIFYING A CALLER OF MESSAGE CONFIRMATION IN A WIRELESS COMMUNICATION SYSTEM

(75) Inventor: Hyun-Jeong Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 2651 days.

(21) Appl. No.: 09/734,852

(22) Filed: Dec. 11, 2000

(65) Prior Publication Data

US 2002/0006782 A1    Jan. 17, 2002

(30) Foreign Application Priority Data

Dec. 11, 1999  (KR) .................................. 1999-56877

(51) Int. Cl.
*H04M 1/725* (2006.01)
(52) U.S. Cl. ...................... 455/412.1; 455/313; 455/466; 455/423; 455/67.7; 379/93.24; 379/100.08; 379/265.09; 379/88.12; 379/100.06
(58) Field of Classification Search .................. 455/413, 455/156.1, 466, 423, 67.7, 412.1, 313; 379/93.24, 379/100.08, 265.09, 88.12, 100.06, 106.06
See application file for complete search history.

(56) References Cited

U.S. PATENT DOCUMENTS

| | | | | |
|---|---|---|---|---|
| 3,866,206 | A * | 2/1975 | DeGiorgio et al. | 340/298 |
| 5,280,521 | A * | 1/1994 | Itoh | 455/403 |
| 5,440,405 | A * | 8/1995 | Ahmed | 358/435 |
| 5,949,865 | A * | 9/1999 | Fusinato | 379/221.09 |
| 5,966,652 | A * | 10/1999 | Coad et al. | 455/412.1 |
| 6,085,101 | A * | 7/2000 | Jain et al. | 455/500 |
| 6,185,433 | B1 * | 2/2001 | Lele et al. | 455/528 |
| 6,188,872 | B1 * | 2/2001 | Nagira et al. | 455/11.1 |
| 6,212,260 | B1 * | 4/2001 | Baum et al. | 379/38 |
| 6,216,106 | B1 * | 4/2001 | John | 704/270 |
| 6,278,377 | B1 * | 8/2001 | DeLine et al. | 340/815.4 |
| 6,304,636 | B1 * | 10/2001 | Goldberg et al. | 379/88.14 |
| 6,466,782 | B2 * | 10/2002 | Ishikawa et al. | 455/412.2 |
| 6,477,243 | B1 * | 11/2002 | Choksi et al. | 379/100.06 |

FOREIGN PATENT DOCUMENTS

| | | |
|---|---|---|
| EP | 0371605 A2 * | 6/1990 |
| KR | 1019990010310 | 2/1999 |

* cited by examiner

*Primary Examiner* — Nghi Ly
(74) *Attorney, Agent, or Firm* — The Farrell Law Firm, P.C.

(57) ABSTRACT

There is provided a method of notifying a caller of confirmation of a voice or text message in a wireless communication system. A calling mobile station transmits a voice or text message to a called mobile station. If the called mobile station senses confirmation of the received voice or text message, it notifies a calling mobile station of the message confirmation via a confirmation message. Upon receipt of the confirmation message, the calling mobile station alerts a caller to receipt of the confirmation message.

11 Claims, 4 Drawing Sheets

METHOD OF NOTIFYING A CALLER OF MESSAGE CONFIRMATION IN A WIRELESS COMMUNICATION SYSTEM

PRIORITY

This application claims priority to an application entitled "Method of Notifying Caller of Message Confirmation by Called Party" filed in the Korean Industrial Property Office on Dec. 11, 1999 and assigned Ser. No. 99-56877, the contents of which are hereby incorporated by reference.

BACKGROUND OF THE INVENTION

1. Field of the Invention

The present invention relates generally to a method of confirming a voice or text message in a wireless communication system, and in particular, to a method of notifying a caller that a called party has confirmed a voice or text message.

2. Description of the Related Art

A wireless communication system typically refers to a system that provides communication services between wireless subscribers or between wireless subscribers and wired subscribers over a wireless network. A major wireless communication system is a CDMA (Code Division Multiple Access) mobile communication system. The wireless communication services are developed along the trend toward circuit and packet services as well as voice service.

In the voice service, if a calling wireless subscriber wants a voice call, he enters a specific telephone number to request the voice call. Upon receipt of the request, a wireless network calls a corresponding called wireless subscriber in a general procedure. When the called party (receiving party) answers the call, the voice call connection is established. On the contrary, if the called party does not answer the call, the wireless network notifies the caller that the call was not answered and asks him whether he wants to leave a message by voice or by text. A text message may be the telephone number of the caller. If the caller leaves a voice or text message, the wireless network notifies the called party of delivery of the voice or text message. Thus, the called party recognizes from the delivered voice or text message that the caller had called him.

However, in cases where the called party does not call back the caller in response to the message left, the caller cannot know whether the called has read/played back the text/voice message. Thus, the caller inconveniently must attempt to call again.

Meanwhile, if a voice or text message is conveyed in a situation where the called party is not available for a call, he cannot deal with the message appropriately, thus probably will receive the voice or text message again from the caller.

SUMMARY OF THE INVENTION

It is, therefore, an object of the present invention to provide a method of notifying a calling wireless subscriber whether a called wireless subscriber has confirmed a voice message.

It is another object of the present invention to provide a method of notifying a calling wireless subscriber whether a called wireless subscriber has confirmed a text message.

It is a further object of the present invention to provide a method of alerting a calling wireless subscriber that a called wireless subscriber has confirmed a voice message delivered from the calling wireless subscriber.

It is still another object of the present invention to provide a method of alerting a calling wireless subscriber to be notified whether a called party has confirmed a text message delivered from the calling wireless subscriber.

To achieve the above objects, there is provided a method of notifying message confirmation in a wireless communication system. According to one aspect of the present invention, to notify a caller that a called party has confirmed a received message, a called mobile station checks whether a message has been received from a calling mobile station. Upon receipt of the message, the called mobile station checks whether the called party has entered a key corresponding to confirmation of the message. If the key is entered, the called mobile station transmits a confirmation message to the calling mobile station.

According to another aspect of the present invention, to notify a caller that a called party has confirmed his message, a voice mail center stores called information, caller information, and a message upon receipt of the message. The voice mail center then checks whether the called party has been connected to the voice mail center and confirmed the received message. If the message was confirmed, the voice mail center transmits a confirmation message to the caller using the stored caller information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
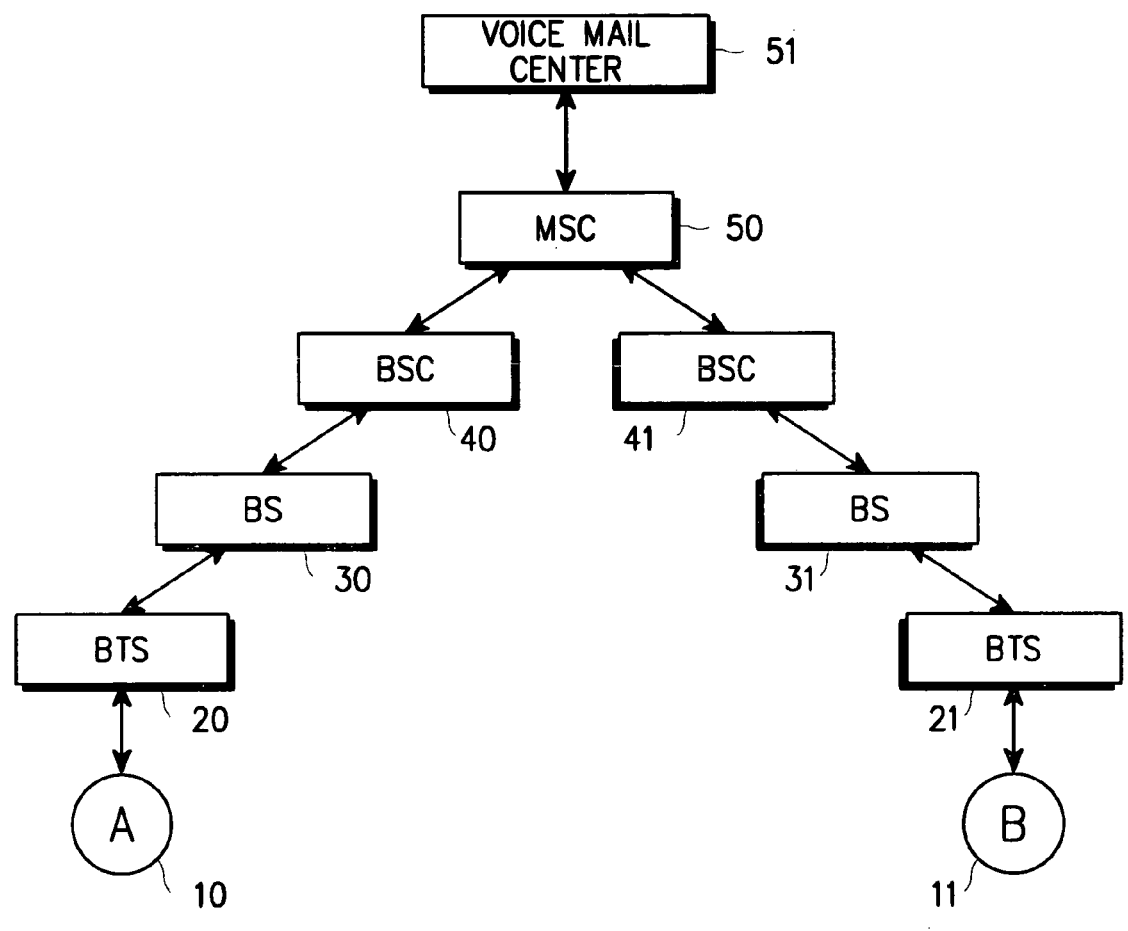
FIG. 1 is a schematic view of a wireless communication system according to an embodiment of the present invention.

FIG. 1 is a schematic view of a typical wireless communication system connected to a voice mail center 51.

Referring to FIG. 1, an MSC (Mobile Switching Center) 50 provides overall control to the wireless communication system and is connected to the voice mail center 51 for storing and transmitting a voice message. Besides, the MSC 50 controls the whole operation needed to receive a text message from a specific calling mobile station and process the text message. The MSC 50 is comprised of a plurality of base station controllers (BSCs) 40 and 41. The BSCs 40 and 41 include a plurality of base stations (BSs) 30 and 31, respectively and implement a handoff within the same BS. The BSs 30 and 31 have a plurality of base station transceiver systems (BTSs) 20 and 21. The BTSs 20 and 21 are directly connected to mobile stations (A, B) located within a particular sector for radio communication.

Figure 2:
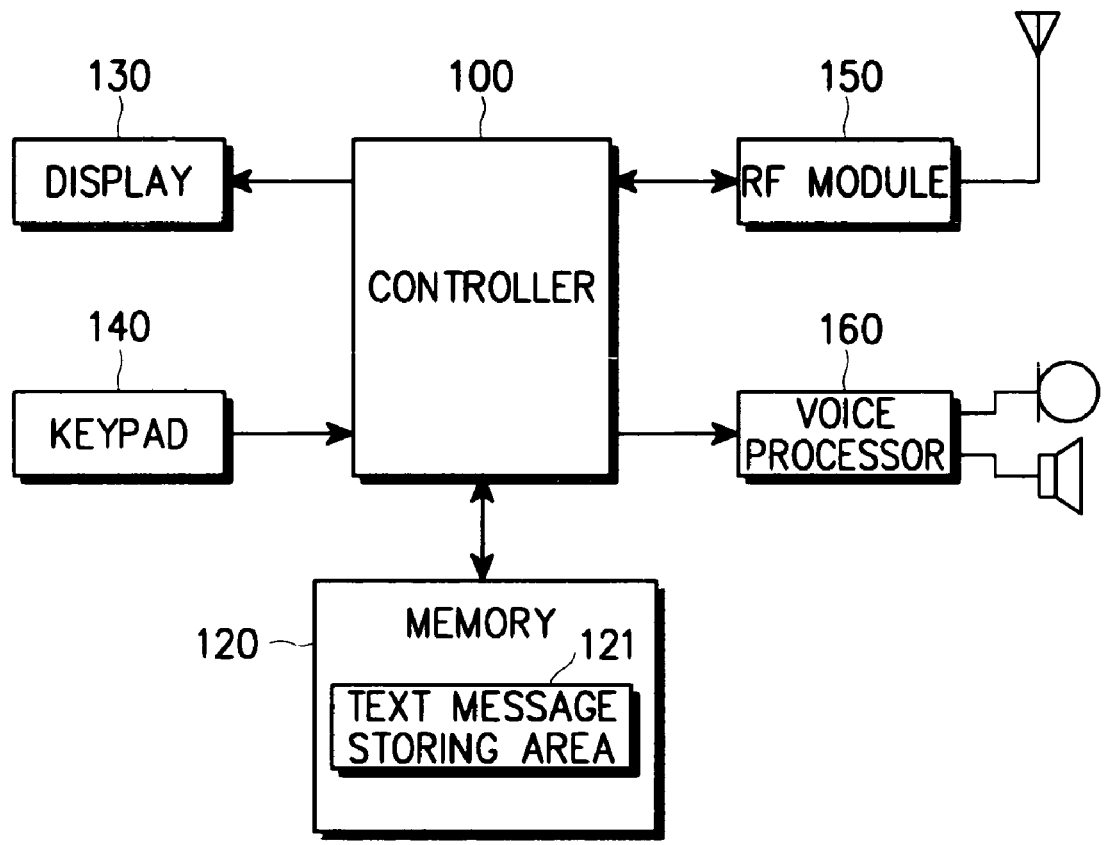
FIG. 2 is a block diagram of a mobile station according to the embodiment of the present invention.

FIG. 2 is a block diagram of a mobile station according to an embodiment of the present invention.

Referring to FIG. 2, a controller 100 provides overall control to the mobile station. According to the embodiment of the present invention, the controller 100 controls an operation of sounding an alarm when the mobile station, as a caller, receives a confirmation message and an operation of transmitting the confirmation message to a caller after the mobile station, as a called party confirms a received message.

A keypad 140 includes a plurality of digit keys, alphabet keys, function (FCN) keys, a store (STO) key, a volume down/up key, and navigation keys (up, down, left, and right). Key data is generated by pressing the keys.

A memory 120 is comprised of a RAM (Random Access Memory), a ROM (Read Only Memory), and a voice memory, for storing an operation program and temporarily storing data generated during execution of the operation program. The memory 120 has a text message storing area 121 for storing a received text message and a confirmation message format (not shown) according to the embodiment of the present invention.

A display 130 displays data received from the keypad 140, information about operation states, and so on. The display 130 also displays a text message received under the control of the controller 100. An LCD (Liquid Crystal Display) may be used as the display 130.

An RF (Radio Frequency) module 150 modulates/demodulates a signal transmitted/received through an antenna (ANT) through amplification and filtering.

A voice processor 160 processes voice received from a microphone (MIC), demodulates voice data received from the RF module 150, and outputs the demodulated voice data through a speaker (SPK) under the control of the controller 100. The voice processor 160 sounds an alarm under the control of the controller 100. The alarm is used to notify receipt of a voice or text message or presence of a voice call request.

Figure 3:
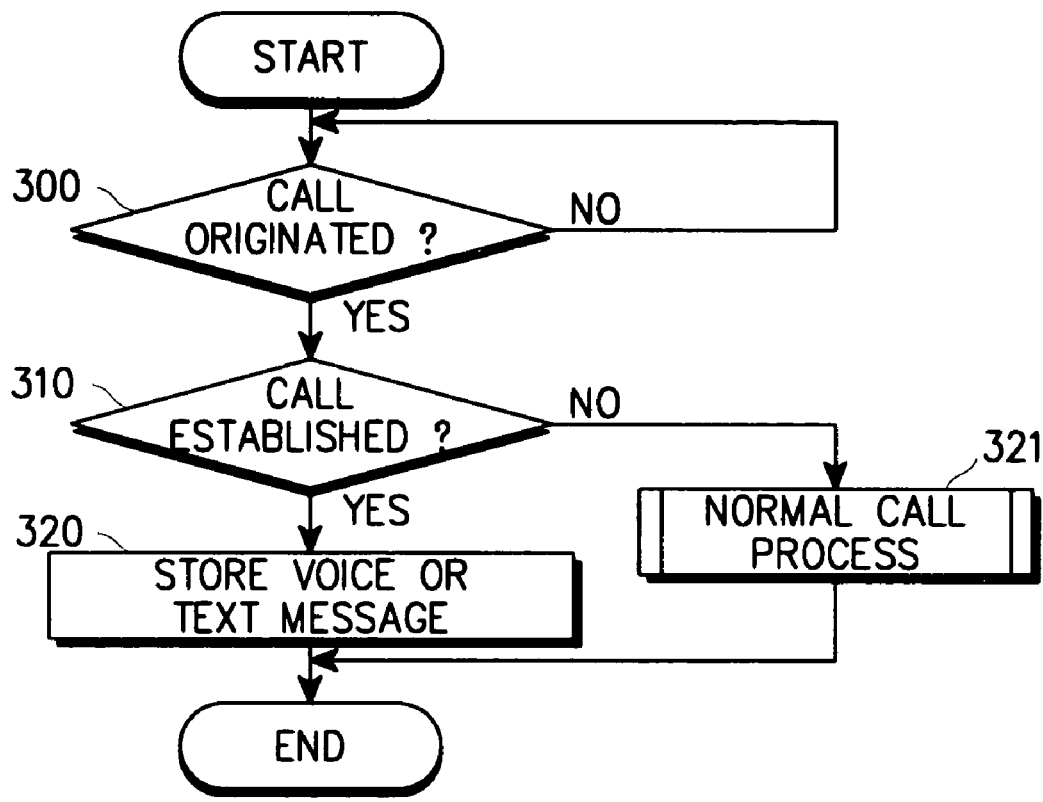
FIG. 3 is a flowchart illustrating a control operation for transmitting a voice or text message by a caller according to the embodiment of the present invention.

FIG. 3 is a flowchart illustrating a control operation for transmitting a voice or text message by a calling mobile station according to the embodiment of the present invention. As shown in FIG. 3, if a call is not normally established upon call request, the voice or text message is stored and then the MSC notifies a corresponding called mobile station of delivery of the message.

Figure 4:
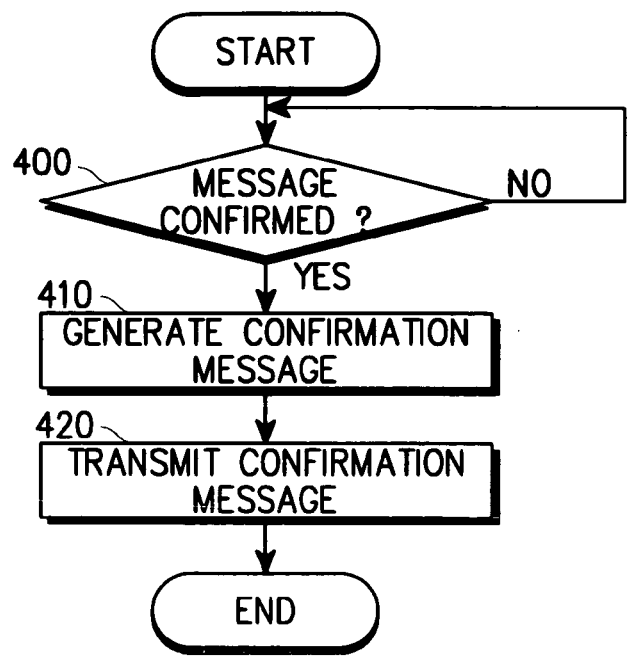
FIG. 4 is a flowchart illustrating a control operation for confirming a received message and notifying the caller of the message confirmation by a called party according to the embodiment of the present invention.

FIG. 4 is a flowchart illustrating a control operation for confirming a received message and notifying the calling mobile station of the message confirmation by the called mobile station according to the embodiment of the present invention. As shown in FIG. 4, when the called party confirms the corresponding message, he generates a confirmation message and transmits it.

Figure 5:
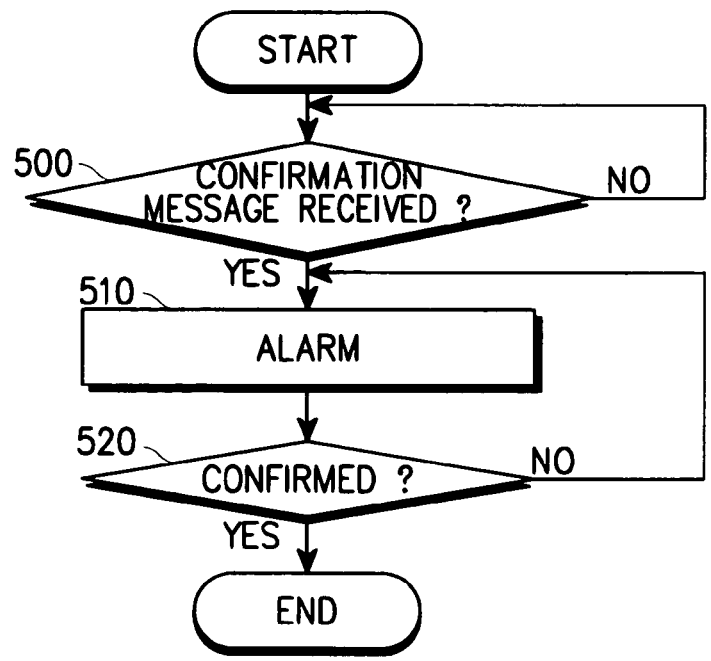
FIG. 5 is a flowchart illustrating a control operation for alerting the caller whether the called party has confirmed a message according to the embodiment of the present invention.

FIG. 5 is a flowchart illustrating a control operation for alerting the caller that the called party has confirmed his message by the calling wireless mobile station according to the embodiment of the present invention. As shown in FIG. 5, upon receipt of the confirmation message, the calling wireless mobile station sounds an alarm to alert the caller.

Referring to FIGS. 3, 4, and 5, the embodiment of the present invention will be described in detail with the appreciation that to discriminate between a calling wireless mobile station and a called wireless mobile station, "A" will be added to the reference numerals indicating the components of the former and "B" to the reference numerals indicating the components of the latter.

Referring to FIG. 3, when the caller wants a voice call, he presses digit keys corresponding to the telephone number of the called party and a send key in the keypad 140A of his mobile station (terminal) 10A. The keypad 140A generates key data corresponding to the pressed keys and feeds them to the controller 10A. Then, the controller 100A transmits a message for calling the called party to the RF module 150A in step 300. If the key data is not received, the process returns to START.

Upon request of a call from the calling terminal 10A, the MSC 50 calls a called terminal 10B. Then, the calling terminal 10A receives ring-back tones, thus confirming that the call is being attempted.

After the call origination, the calling terminal 10A checks whether the call is normally established in step 310. If it is determined that the call is normally established, the controller 100A performs a normal call process in step 321. Otherwise, the controller 100A proceeds to step 320. The controller 100A can determine that the call is not established by receiving a notification message from the MSC 50 after the ring-back tones are terminated, for example. Via the notification message, the caller may be notified that the requested call is not available and instructed to leave a voice or text message.

The caller transmits a voice or text message to the MSC 50 in a predetermined procedure in response to the notification message. In step 320, the calling terminal 10A operates to receive the voice or text message from the caller and transmit it to the MSC 50.

The MSC 50 processes the received voice or text message in a predetermined procedure. For example, upon receipt of a text message, the MSC 50 transmits the text message to the called terminal 10B by the SMS (Short Message Service). The called terminal 10B stores the text message in the text message storing area 121B of the memory 120B in such a way as shown in Table 1 by way of example.

TABLE 1

| caller number | message | time |
|---|---|---|
| 001-111-2222 | ... | Dec. 25, 1999 |

In the case of a voice message, the MSC 50 stores the received voice message in the voice mail center 51 and notifies the called terminal 10B that the voice message has arrived. Table 2 is an example of a memory table with the voice message in the voice mail center 51.

TABLE 2

| caller number | called number | message | time |
|---|---|---|---|
| 001-111-2222 | 002-333-4444 | ... | Dec. 25, 1999 |

Upon receipt of the voice or text message in the above procedure, the called terminal 10B operates to confirm the received message in the procedure shown in FIG. 4. The procedure can be considered in two ways: a voice message and a text message.

In the case of a text message, the controller 100B of the called terminal 10B receives the text message from the MSC 50 and stores it in the text message storing area 121B as stated above. Meanwhile, the controller 100B controls the voice processor 160B to sound an alarm to alert the called terminal or controls the display 130B to inform the called terminal that the text message has been delivered.

In step 400, the controller 100B checks whether the called has read the text message and then entered key data related to confirmation of the text message via the keypad 140B.

If the message confirmation is sensed in step 400, the controller 100B generates a confirmation message in step 410. If the message confirmation is not sensed, the process returns to START. The confirmation message may be a data burst message transmittable/receivable to/from a BS during a call or in an idle state. The data burst message is a message type preset to transmit a short message.

The confirmation message includes BS parameters received from a BS when the mobile station is registered in the BS, a caller address (caller telephone number), and information indicating that the called party has confirmed the received message. The caller telephone number can be obtained from information shown in Table 1.

In step 420, the controller 100B transmits the confirmation message to the MSC 50. The MSC 50 transmits the confirmation message to the calling terminal 10A.

Now, an operation of transmitting a voice message by the calling terminal 10A and transmitting a confirmation message in response to the voice message by the called terminal 10B will be described in detail referring to FIG. 4.

As described above, the MSC 50 notifies the controller 100B of the called terminal 10B that the voice message has arrived. The controller 100B controls the voice processor 160B to sound an alarm to alert the called party or controls the display 130B to inform the called party that the voice message has been delivered.

In response, the called terminal performs a normal procedure for confirming the received voice message and the controller 100B monitors the message confirmation in step 400. In the normal voice message confirming procedure, the called terminal 10B is connected to the voice mail center 51 via the MSC 50 upon request of the called party, selects the voice message, and plays back the voice message.

If it is determined that the called terminal has confirmed the voice message, the controller 100B generates a confirmation message in the same manner as the confirmation message for a text message in step 410. Then, the controller 100B transmits the generated confirmation message in step 420.

The above description has been made on the premise that the called terminal 10B transmits the confirmation message for the voice message, but it can be further contemplated that the voice mail center 51 or the MSC 50 transmits the confirmation message instead. This confirmation message for the voice message may be the same message type as that for the text message.

Finally, an operation of receiving and processing the confirmation message in the calling terminal 10A will be described in detail with reference to FIG. 5.

The controller 100A of the calling terminal 10A determines whether the confirmation message for the voice or text message has been received in step 500. If not, the process returns to START. Upon receipt of the confirmation message, the controller 100A controls the voice processor 160A to sound an alarm to alert the caller or controls the display 130A to inform the caller of receipt of the confirmation message in step 510. In step 520, the controller 100A continuously checks whether the caller has confirmed the confirmation message. The controller 100A determines that the caller has confirmed the confirmation message when it receives key data corresponding to a particular key in the keypad 140A. If the confirmation message is confirmed in step 520, all the procedures according to the embodiment of the present invention are over. If the message is not confirmed, the process returns to step 510. Even in case the caller does not confirm the confirmation message until a predetermined time expires, the controller 100A may consider that it was confirmed.

In accordance with the present invention, a called party notifies a caller whether he has confirmed a received message. Therefore, the caller does not need to transmit the same message repeatedly and the called party does not need to transmit a separate message for the notification either.

While the invention has been described in context with transmission of a voice or text message by a caller, it is a mere exemplary application and thus can be applied to receipt of an image message or electronic mail. Therefore, it will be understood by those skilled in the art that various changes in form and detail may be made therein without departing from the spirit and scope of the invention as defined by the appended claims.

What is claimed is:

1. A method of communicating a confirmation message, comprising the steps of:
   informing a called mobile station of receipt of a message from a calling mobile station;
   determining, when the received message is a text message, whether a called party of the called mobile station has read the received message, which is stored in the called mobile station; and
   transmitting, from the called mobile station, a confirmation message directly to the calling mobile station, wherein the confirmation message is generated by the called mobile station when the called party of the called mobile station has read the received message, wherein the confirmation message is a data burst message transmittable to or receivable from a base station during a call or in an idle state, and wherein the confirmation message includes a telephone number of the calling mobile station.

2. The method of claim 1, further comprising the step of determining, if the received message is a voice message, whether the called mobile station is connected to a voice mail center in order to confirm the received voice message.

3. The method of claim 1, wherein the confirmation message is a short message.

4. The method of claim 1, further comprising the steps of:
   sounding an alarm; and
   displaying, in the calling mobile station, information indicating receipt of the confirmation message, upon receipt of the confirmation message.

5. The method of claim 1, wherein the determining step comprises:
   determining whether a confirmation key of a key input part to confirm the received message is pushed by the user of the called mobile station.

6. A method of communicating a confirmation message, comprising the steps of:
   determining, by a called mobile station, when a voice call is not normally established between the called mobile station and a calling mobile station, whether a called party of the called mobile station has played back a message, wherein the message is created and transmitted by the calling mobile station;
   generating, by the called mobile station, a confirmation message when the called party of the called mobile station has played back the message; and
   transmitting, from the called mobile station, the confirmation message directly to the calling mobile station, wherein the confirmation message is a data burst message transmittable to or receivable from a base station during a call or in an idle state.

7. The method of claim 6, wherein the message transmitted by the calling mobile station is a voice message.

8. The method of claim 6, wherein the confirmation message is a short message.

9. The method of claim 6, further comprising the steps of:
sounding an alarm, and displaying, in the calling mobile station, information indicating receipt of the confirmation message, upon receipt of the confirmation message.

10. The method of claim 6, wherein the confirmation message includes a telephone number of the calling mobile station.

11. The method of claim 6, wherein the determining step comprises:
determining whether a confirmation key of a key input part to confirm the message is pushed by the user of the called mobile station.

* * * * *